(12) United States Patent
Sherer

(10) Patent No.: US 10,769,861 B2
(45) Date of Patent: Sep. 8, 2020

(54) DYNAMIC CONNECTION ROUTING IN VIRTUAL PRODUCT CONFIGURATIONS

(71) Applicant: Axonom Inc., Minneapolis, MN (US)

(72) Inventor: Joshua Sherer, Minneapolis, MN (US)

(73) Assignee: Axonom Inc., Minneapolis, MN (US)

( * ) Notice: Subject to any disclaimer, the term of this patent is extended or adjusted under 35 U.S.C. 154(b) by 306 days.

(21) Appl. No.: 15/906,903

(22) Filed: Feb. 27, 2018

(65) Prior Publication Data
US 2018/0253910 A1 Sep. 6, 2018

Related U.S. Application Data

(60) Provisional application No. 62/466,201, filed on Mar. 2, 2017.

(51) Int. Cl.
| | |
|---|---|
| *G06F 3/14* | (2006.01) |
| *G06T 19/20* | (2011.01) |
| *G06F 3/0486* | (2013.01) |
| *G06F 30/13* | (2020.01) |
| *G06F 30/18* | (2020.01) |
| *G06F 113/14* | (2020.01) |
| *G06F 113/16* | (2020.01) |

(52) U.S. Cl.
CPC ............ *G06T 19/20* (2013.01); *G06F 3/0486* (2013.01); *G06F 30/13* (2020.01); *G06F 30/18* (2020.01); *G06F 2113/14* (2020.01); *G06F 2113/16* (2020.01); *G06T 2219/2004* (2013.01)

(58) Field of Classification Search
CPC ........................................................ G06F 3/14
USPC ............................ 715/764; 345/156; 702/34
See application file for complete search history.

(56) References Cited

U.S. PATENT DOCUMENTS

| | | | |
|---|---|---|---|
| 2014/0184496 A1* | 7/2014 | Gribetz ............... | G06F 3/04842 345/156 |
| 2017/0089710 A1* | 3/2017 | Slusar ...................... | B60R 1/00 |
| 2017/0234775 A1* | 8/2017 | Finch ..................... | B60C 11/24 702/34 |
| 2018/0125409 A1* | 5/2018 | Tahara ................... | A61B 10/00 |
| 2018/0189578 A1* | 7/2018 | Yang ....................... | G06T 17/00 |

* cited by examiner

*Primary Examiner* — Ruay Ho
(74) *Attorney, Agent, or Firm* — Rowan TELS LLC

(57) ABSTRACT

A method comprising receiving a first component control signal; receiving a second component control signal; determining connections between the components represented by the first component control signal and the second component control signal; generating an assembly control signal; and sending the assembly control signal to affect a machine state of one or more machines.

18 Claims, 12 Drawing Sheets

DYNAMIC CONNECTION ROUTING IN VIRTUAL PRODUCT CONFIGURATIONS

CROSS-REFERENCE TO RELATED APPLICATIONS

This application claims benefit under 35 U.S.C. 119 to U.S. application Ser. No. 62/466,201, entitled "Dynamic Connection Routing in Virtual Product Configurations", filed on Mar. 2, 2017, and incorporated herein by reference in its entirety.

BACKGROUND

Often, products within an assembly have inputs and outputs that need to be connected via cable, pipe, tubing, etc. Additionally, those connections often have to be routed through the assembly in particular ways, depending on the preferences of the end user of the item. Collecting user preferences, configuring connectivity options, and determining connection media necessary to accommodate those connections increases accuracy of the quote and completeness of the design. Users that are not intimately familiar with the technical details of the components involved in the assembly may inefficiently spend time determining the connections for the assembly. Even experienced users may spend a great amount of time due to the number of connections involved in some systems.

Existing solutions either lack spatial awareness of the products being configured or have no concept of the inputs and outputs of the system and simply overlook these inputs. Connections and connection media are often determined at assembly or after purchase leading to increased cost. Other design tools are capable of representing connectivity routes, but require significant skill and education by the end user. These programs lose efficiency by not limiting user choices in helpful ways or automatically generating a connection parts list that may be utilized to calculate the total cost of an assembly.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Users may interact with 2D or 3D representations of products to control component selection, position, color/finish options, and connectivity to enable evaluation of price and fit of the resulting design assembly. Dynamic routing automatically connects products according to a set of attributes and rules describing how those inputs and outputs behave, and how to generate the path between them. Routing may happen automatically, or with user input to direct the engine to certain preferences. Users may manually assign or override routes generated. The routes are displayed in the visualization of the assembly in the form of color-coded lines, and the materials necessary to make the connections for the overall assembly may be formatted as a list. The assembly may be utilized for other purposes, as well. For instance, assembly instructions can be generated to ensure that the delivered product matches the quoted design.

The system may utilize a variety of software subsystems, including a web browser or other suitable client application container, a 2D renderer, a 3D renderer, a client software stack capable of executing application logic and communicating with a server, a server software stack capable of executing application logic and communicating with a database or other persistent storage media, existing application logic related to tasks such as product configuration and pricing, and a database to store persistent data.

Figure 1:
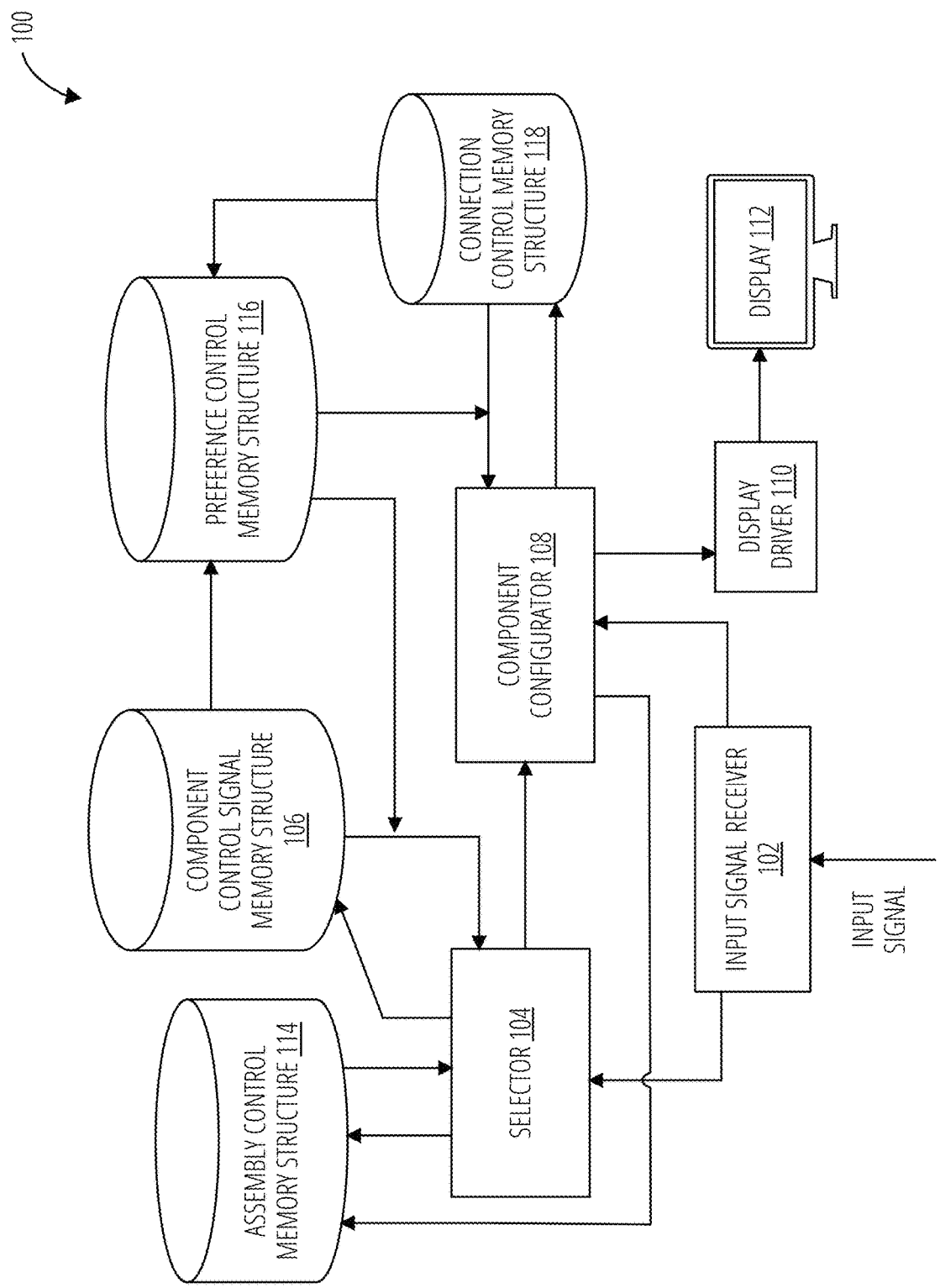
FIG. 1 illustrates an embodiment of a component connection routing system 100.

Referring to FIG. 1, a component connection routing system 100 comprises an input signal receiver 102, a selector 104, a component control signal memory structure 106, a component configurator 108, a display driver 110, a display 112, an assembly control memory structure 114, a preference control memory structure 116, and a connection control memory structure 118.

The input signal receiver 102 receives an input signal. The input signal receiver 102 determines the type of input signal received. The input signal receiver 102 may differentiate between input signals that select a component, alters a previously selected component, alters one of the connections, or selects an assembly. This process may be performed in accordance with the process depicted in Listing (i). The input signal receiver 102 may be integrated with a user interface to receive input signals from a user. The input signal receiver 102 sends an input signal that selects one of the components or selects an assembly to the selector 104. The input signal receiver 102 sends an input signal that alters one of the previously selected components or alters one of the previously determined connections to the component configurator 108.

The selector 104 receives the input signals from the input signal receiver 102, the component control signals from the component control signal memory structure 106, and the assembly control signals from the assembly control memory structure 114. The selector 104 may receive the input signals to select the component control signal from the component control signal memory structure 106. The selector 104 sends a selection control signal to the component control signal memory structure 106 to retrieve the component control signal selected by the input signal and, in response, receives the component control signal from the component control signal memory structure 106. The selector 104 may send an assembly selection control signal to the assembly control memory structure 114 and, in response, receive the assembly control signal. The selector 104 then sends the component control signal or the assembly control signal to the component configurator 108.

The component control signal memory structure 106 receives the selection control signal from the selector 104. In response, the component control signal memory structure 106 sends the component control signal to the selector 104. The component control signal memory structure 106 also sends a query control signal to the preference control memory structure 116. The query control signal comprises instructions for the preference control memory structure 116 to determine whether a preference control signal is associated with the component control signal. Each component control signal comprises information regarding a component, which is data representation of a physical object. The components may be 3D matrices. The 3D matrices may further comprises one or more cells. The cells may selectively receive other components. Examples include servers, switches, power management devices, etc. The information includes component properties, such as spatial, weight, thermal, and electrical properties and specific locations of connection ports and rules pertaining to decisions and relations to other components, including constraints. The constraints may include spatial, weight, thermal, electrical constraints, and location constraints. The component control signal may provide information for the component in three spatial dimensions. One or more of the surfaces of the component may be a panel comprising one or more attachment points. The one or more attachment points may determine how a component connects to other components in an assembly or room via connection media (cables, tubing, etc.). Each attachment point may also be a port attachment point. Port attachment points may represent sockets, outlets, nozzles, or other physical features on the product that accept a connection. Examples include an RJ45 Ethernet port on a server or switch in a data center, a 3-prong electrical power plug, and a nozzle where the plastic tubing from an anesthesia mask is connected to a gas machine. Ports are associated with attributes that are utilized to determine connections. The connections may include position, media type, connector, behavior, and number. Position is the coordinates (X,Y,Z) on the product where the port resides. Media type is the type of connection media that may be connected to the port. Connector is the type of plug or terminator on the connection media that the port accepts. Behavior is input, output, cable management, etc. Number is utilized to identify the port on the component in human-readable form, particularly when there is more than one port of the same type present (two Ethernet ports on one server product, for example). The component control signal, including components, attachment points, and ports, may be added to the component control signal memory structure 106 during an authoring phase.

The component configurator 108 receives the input signals from the input signal receiver 102, component control signals and assembly control signals from the selector 104, and one or more connection controls from the connection control memory structure 118. The one or more connection controls may be received in response to the component configurator 108 sending a configurator connection control signal to the connection control memory structure 118. The component configurator 108 utilizes the input signals, the component control signals, and the one or more connection controls to determine whether or not two or more components are to be connected. This process may be performed in accordance with the process depicted in Listing (ii). If two or more components are to be connected, the component configurator 108 determines the media type, length, and location of connection ports for each connection, and may utilize adjustable slack factor when determining the length. The length and the slack factor may be determined according to the processes depicted in Listing (iii). The component configurator 108 may filter the component connection ports to determine the connections of a same connection type between the components. From this information, the component configurator 108 determines a connection between the components. The component configurator 108 may determine multiple connections for the components, selecting the connection that meets a selected criteria, such as minimizing total cost based on the connections implemented. The component configurator 108 generates an assembly control signal that comprises the connections and the components. The component configurator 108 may utilize input signals to alter a component by changing the position or preference of the component. The component configurator 108 may also utilize the input signals to alter the route of the connections. The component configurator 108 sends the assembly control signal to the display driver 110. The component configurator 108 may transform the three-dimensional data to a two-dimensional representation prior to sending the assembly control signal to the display driver 110. This process may be performed according to the process depicted in Listing (iv). The component configurator 108 may also send warning control signals to the display driver 110 based on the combination of connections and components. The component configurator 108 further sends the assembly control signal (i.e., the components and the connections) to the assembly control memory structure 114 to be stored.

The display driver 110 receives the assembly control signal from the component configurator 108 to determine what is to be displayed by the display 112. The display driver 110 may determine which components and connections to display, the color coding for each, and whether or not to simplify aspects of the assembly. This process may be performed in accordance with the process depicted in Listing (v). Such simplifications include not displaying slack and converting the three-dimensional data to two-dimensional display data. The display driver 110 may utilize a 2D or 3D renderer, and the display driver 110 then sends this to the display 112. The display 112 may display a 3D virtual space into which the component representations are imposed. The representations for 3D matrices may constrain the placement of other component representations within the 3D virtual space.

The assembly control memory structure 114 receives and stores an assembly control signal sent by the component configurator 108. The assembly control signal may be utilized to generate a computer-aided design and drafting program output, generate a list output, be retrieved by the selector 104 to be sent to the component configurator 108, or to be collated into a manual, which may be utilized to enable a user to construct the assembly as a physical object. The assembly control memory structure 114 may send an empty assembly, such as an empty base vessel, an empty virtual room, or a blank virtual workspace to the selector 104, when the component connection routing system 100 is initialized or when selected. Each assembly control signal may include a representation of the space (e.g., the virtual room), if any, a collection of all component instances present, a collection of all open/unallocated attachment points exposed by the component instances in the assembly, a collection of all connection routes in the assembly, the dimensions/outer bounds of the overall assembly, and the total price for the assembly, which may effectively be the sum of all component prices. The assembly control signal may also include the name of the assembly, which may be provided by the user. Each assembly control signal may include one or more component instances. Each component instance (e.g., of a component control signal) may include the instance ID, the attachment points, the component class, the position, the rotation, the parent instance, the "attached to", and the "attached from". The instance ID is utilized by the component connection routing system 100 to uniquely identify the instance within the overall assembly. The attachment points are a collection of all the attachment point instances of the component instance. The component class is a property defined by the author to categorize the component. The position is the (X,Y,Z) coordinates of this instance in the overall assembly. The rotation is the Euler angle applied to this component instance on attachment to rotate it into a valid position. The parent instance is the component instance that this component is physically attached to. The "attached to" is the attachment point instance on the parent instance that this component attached to. The "attached from" is the attachment point instance on this component that was used to attach to the parent instance.

The preference control memory structure 116 receives a query control from either the component control signal memory structure 106 or the connection control memory structure 118. In response, the preference control memory structure 116 determines whether to modify the component control signal or the connection control based on the preference controls stored by the preference control memory structure 116. In some embodiments, the preference controls may be configurable by a user or by machine controls. In response to being reconfigured, the preference control memory structure 116 sends a preference control signal to modify component control signals and connection control signals sent to the component configurator 108.

The connection control memory structure 118 receives a configurator connection control signal from the component configurator 108. In response, the connection control memory structure 118 may send a connection control to the component configurator 108 and a query control to the preference control memory structure 116. The connection control comprises properties of connection, including types and lengths. In some embodiments, the connection control memory structure 118 may be configurable by a user or by machine controls. Each connection control (or route) may comprise a number of properties including the media type, the start point, the endpoint, the path, the length, and the media instance. The start point is the port attachment point where the route begins. The end point is the port attachment point where the route ends. The path is a collection of (X,Y,Z) coordinates representing the path from the start point to the end point. This comprises at least two points (the start point and the end point), but may also comprise any number of intermediary points depending on the routing strategy utilized. The length is the total distance of the route, plus any slack factor specified by the media type. The media instance is the actual part the route was reconciled to, based on the length, media type, and connector type of each port. Each computed route is added to the assembly's routes collection, and the media instance assigned to it is added to the assembly's components collection to reflect the part's inclusion in the bill of materials and total price of the assembly. The computed route is stored with the assembly control signal in the assembly control memory structure 114. The component connection routing system 100 may display the route as part of the informative overlay it maintains and displays through the display driver 110 and the display 112.

Figure 2:
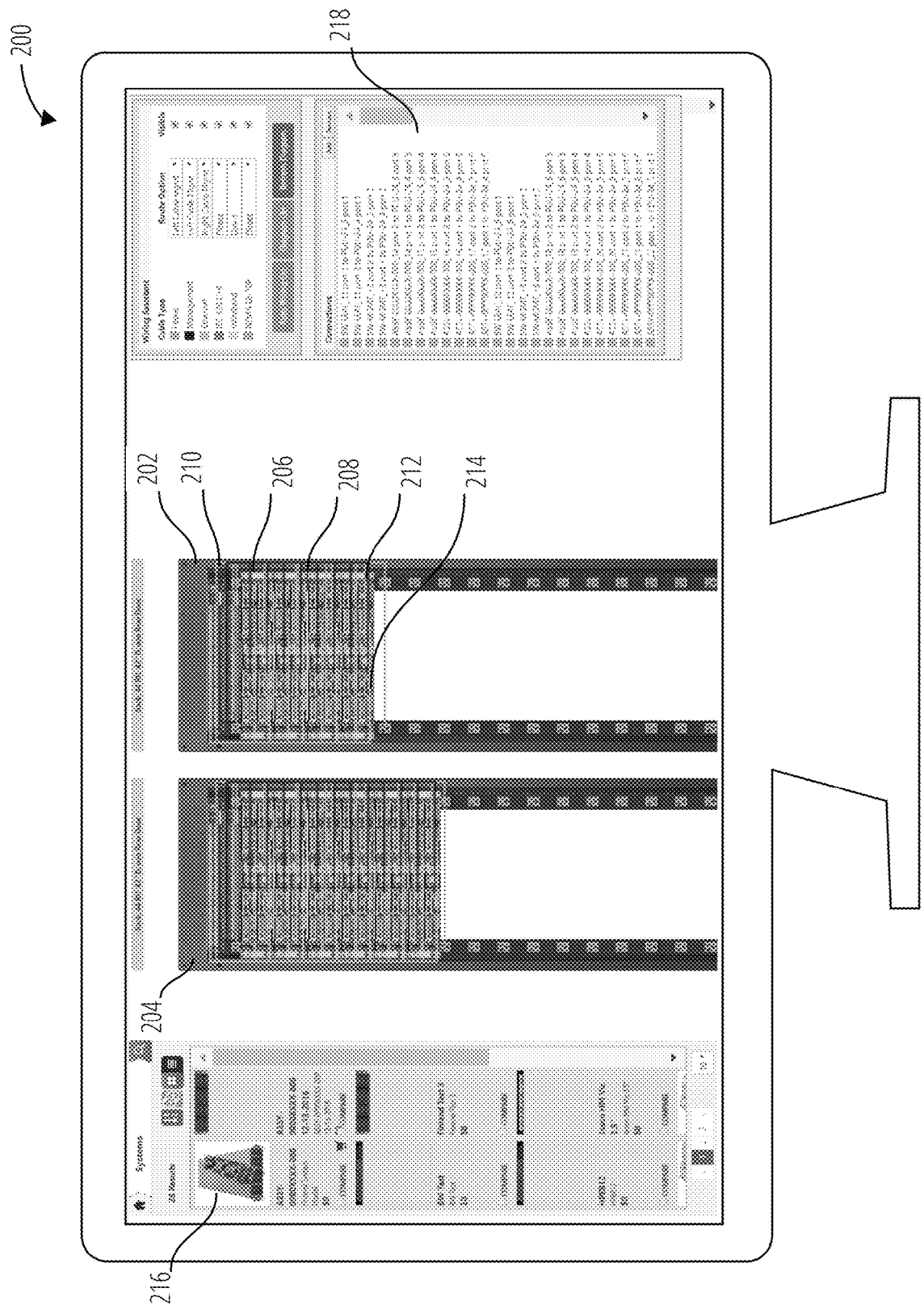
FIG. 2 illustrates an embodiment of a 2D configuration display 200.

Referring to FIG. 2, a 2D configuration display 200 comprises a first component 202, a second component 204, a third component 206, a fourth component 208, a first connection 210, a second connection 212, a third connection 214, a component control display 216, and a connection list 218.

As depicted, the first component 202 and the second component 204 are not connected. The first component 202 is connected to the third component 206 and the fourth component 208 via the first connection 210, the second connection 212, and the third connection 214. Each component and connection has been displayed as a two-dimensional representation, based on a transformation performed by the component configurator 108.

The 2D configuration display 200 utilizes a component control display 216 to represent components stored by the component control signal memory structure 106. An input, such as a user activating a mouse, while associated with the component control display 216 results in an input signal to the input signal receiver 102 for the represented component.

A component, such as the third component 206 or fourth component 208, may be associated with another component, such as the first component 202. Once associated, the component configurator 108 determines the connection ports for each component. Components having a port for the same connection type have a connection made and routed per the rules of the components present. For example, the path of the first connection 210, the second connection 212, and the third connection 214 is along the side of the first component 202. This rule may be associated with the first component 202 (e.g., route connections along the side of the component) or the third component 206 and the fourth component 208 (e.g., do not route connection vertically along component). Additionally, this rule may have been specific to the connection (i.e., the first connection 210, the second connection 212, and the third connection 214). Furthermore, the rule may have been modified by a preference control.

Once the determined connections have been made, the component configurator 108 may increase the length of the connections by a slack factor to account for differences between virtual objects and physical objects. The slack factor may be the same of different based on the connection type and the components being connected. The component configurator 108 may then determine a connection component that meets the length and type of connection determined. The connection list 218 display the connection components determined for the assembly.

An input signal to a component may also alter the position of the component in the assembly. This input signal is received by the input signal receiver 102 and sent to the component configurator 108. The connections are then re-calculated based on the new position if the component within the assembly.

Figure 3:
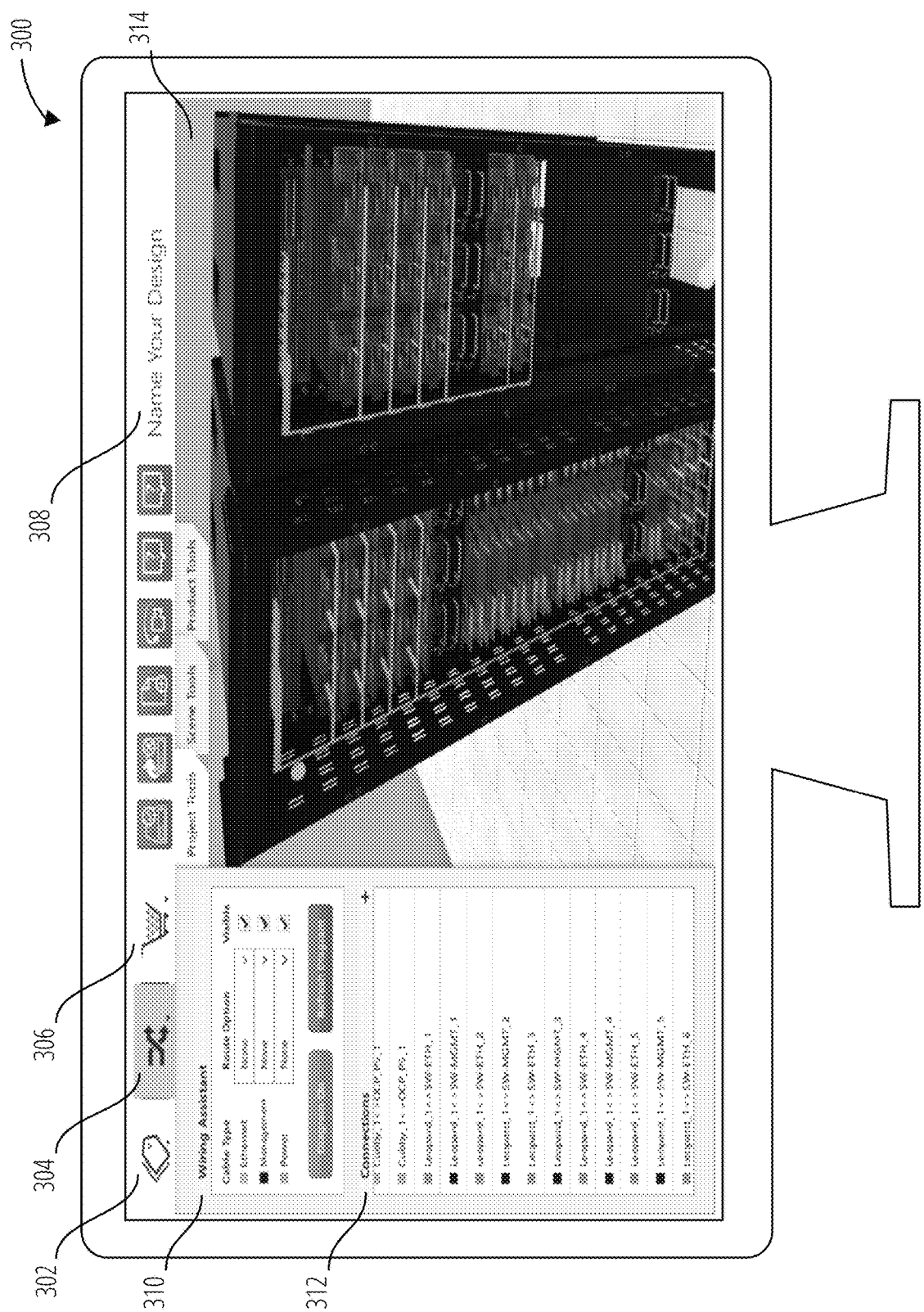
FIG. 3 illustrates an embodiment of a 3D configuration display 300.

Referring to FIG. 3, a 3D configuration display 300 comprises a component selector control 302, a connection view control 304, a materials view control 306, an assembly name association control 308, a connection display control 310, a connection list 312, and an assembly view 314.

Figure 4:
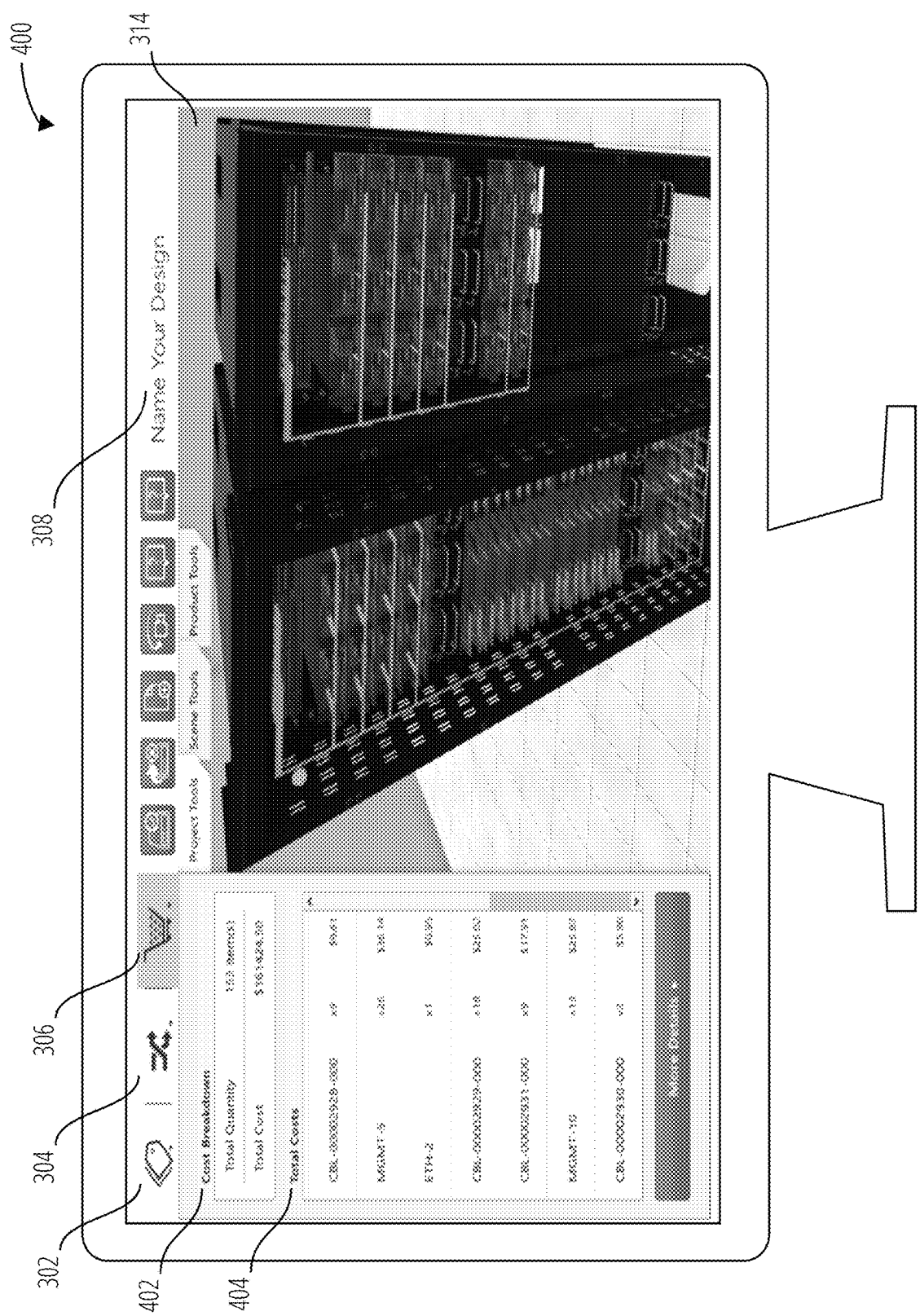
FIG. 4 illustrates an embodiment of a 3D configuration display 400.

The component selector control 302 receives an input and, in response, alters the 3D configuration display 300 to display a list of components from a component control signal memory structure. The list of components may receive a further input to add the associated component to the assembly displayed in the assembly view 314. The component configurator may then operate to add or optimize connections among the components in the assembly. The connection view control 304 receives an input and, in response, alters the 3D configuration display 300 to display the connection display control 310 and the connection list 312 (view depicted in FIG. 3). The connection view control 304 may be updated as further components and connections are added to an assembly. The materials view control 306 receives an input and, in response, alters the 3D configuration display 300 to display the view as depicted in FIG. 4. The assembly name association control 308 receives an input and, in response associates the characters of the input with the assembly control signal associated with the assembly displayed in the assembly view 314.

The connection display control 310 receives inputs to alter the display of connections of the assembly depicted in the assembly view 314. The connection display control 310 may provide input-selectable option to differentiate the connection media type. The connection list 312 display the connections of the assembly depicted in the assembly view 314. The assembly view 314 depicts a visual representation of an assembly. Each of the connections may be visually differentiated based on connection media type. A selector may be utilized to select an assembly control signal from an assembly control memory structure. A display driver then transforms the assembly control signal to be displayed on a display.

Referring to FIG. 4, a 3D configuration display 400 comprises a component selector control 302, a connection view control 304, a materials view control 306, an assembly name association control 308, an assembly view 314, an assembly cost view 402, and a component and connection view 404. The assembly cost view 402 and the component and connection view 404 are displayed in response to an input to the materials view control 306.

The assembly cost view 402 displays a total number of components and connections in the assembly depicted on the assembly view 314 along with the cost associated with those components and connections. The component control signal memory structure may comprise costs associated with each component utilized in an assembly. The connection control memory structure may comprise costs associated with each connection in an assembly. The assembly cost view 402 may be updated when the assembly is updated. The component and connection view 404 depicts the components, the connections, and their associated costs of the assembly depicted in the assembly view 314. The component and connection view 404 may be updated when the assembly is updated. Updates may include adding a component to the assembly, altering the connection rules, etc.

Figure 5:
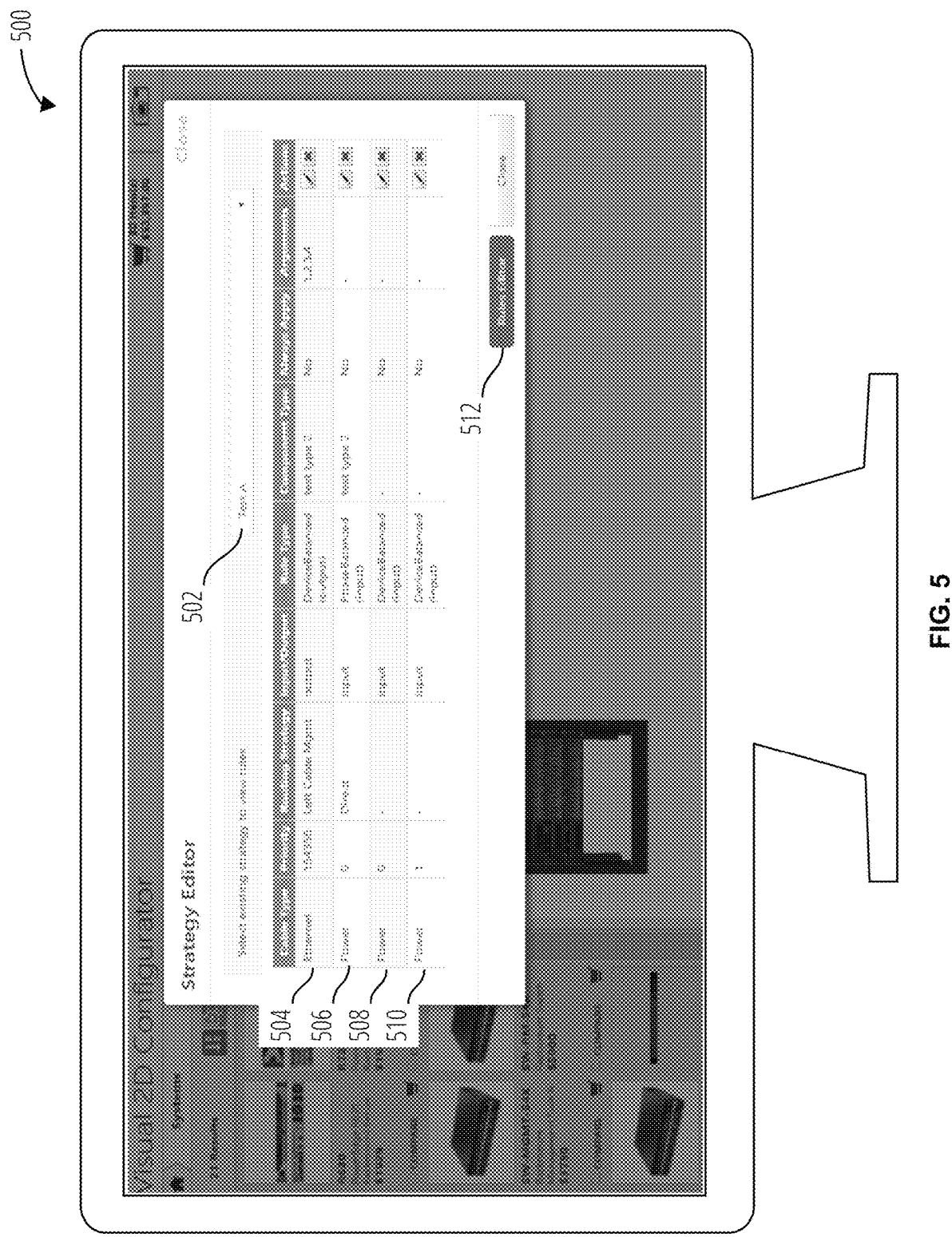
FIG. 5 illustrates an embodiment of a connection strategy display 500.

Referring to FIG. 5, a connection strategy display 500 comprises a strategy selector control 502, a first rule 504, a second rule 506, a third rule 508, a fourth rule 510, and a rule editor control 512.

The strategy selector control 502 shows the current strategy utilized by a component configurator to generate or optimize connections among the components of an assembly. The strategies may be stored as preference control signals in a preference control memory structure. The strategy selector control 502 receives an input (or multiple inputs) to select a different strategy for the assembly. In response to an updated strategy, the component configurator may generate new connections. The new connections may be displayed on the display. The strategy may be associated with the assembly control signal for the assembly.

Each of the first rule 504, the second rule 506, the third rule 508, and the fourth rule 510 depict the rules associated with the selected strategy. The rules are utilized to generate connections among the components of the assembly. The rules may be edited utilizing the rule editor control 512.

Figure 6:
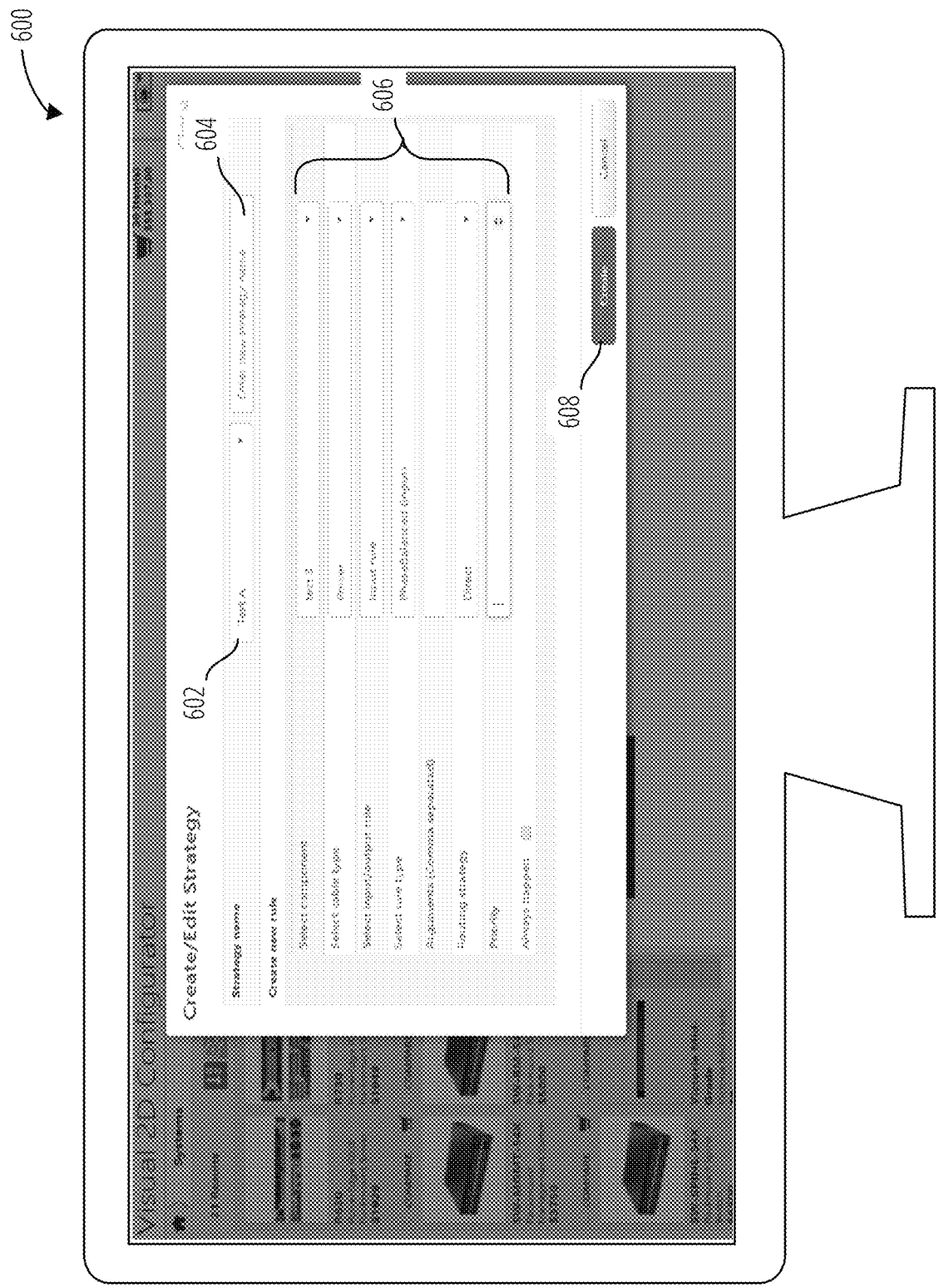
FIG. 6 illustrates an embodiment of a connection strategy edit display 600.
Figure 7:
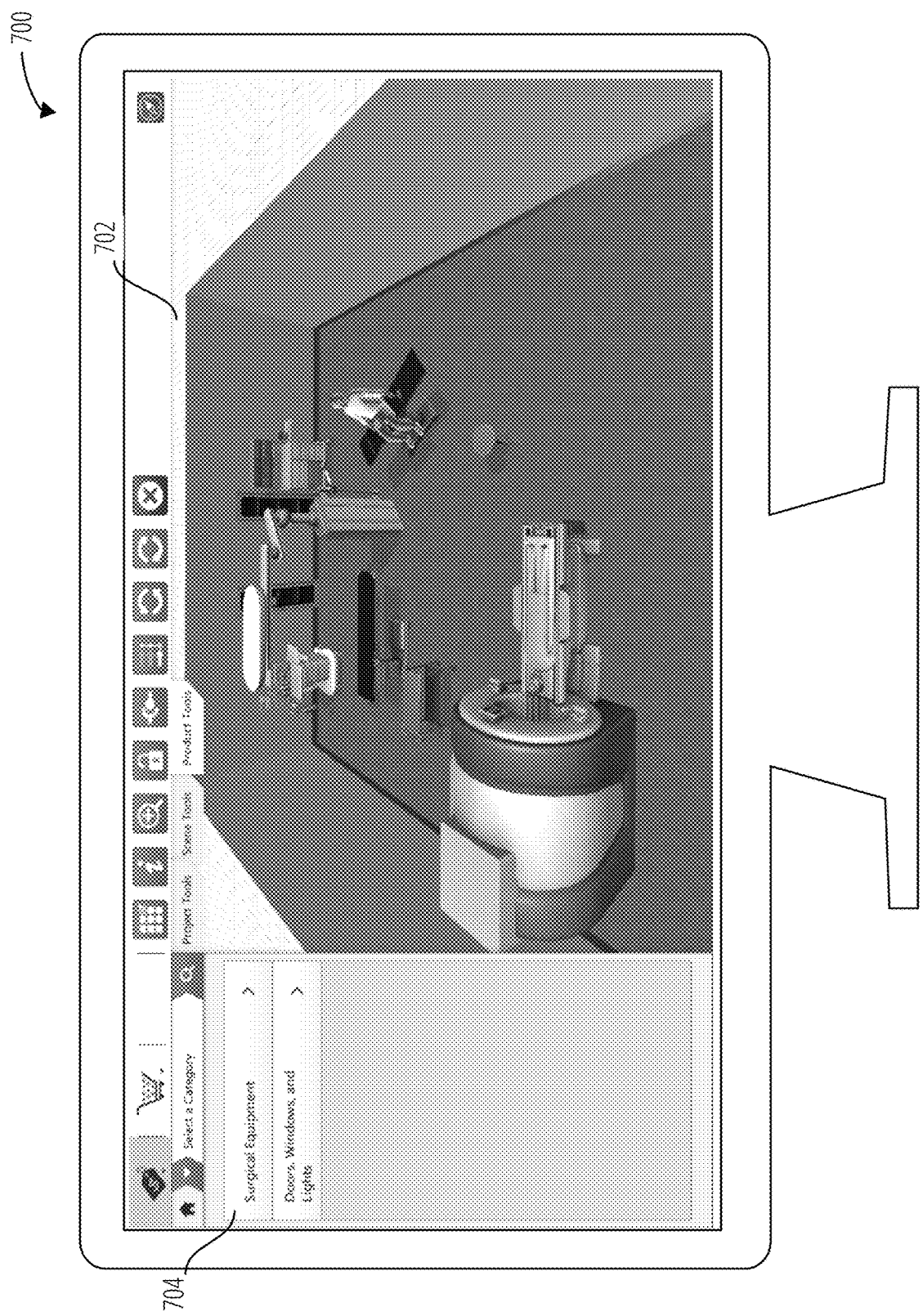
FIG. 7 illustrates an embodiment of a 3D configuration display 700.

The rule editor control 512 receives an input and, in response, the display is altered to display controls to alter, add, or remove rules associated with the selected strategy. An exemplary display is depicted in FIG. 6. Further controls may be utilized to receive inputs to alter the rules.

Referring to FIG. 6, a connection strategy edit display 600 comprises a strategy selector control 602, a strategy generation control 604, a rule attribute controls 606, and a rule generation control 608.

The strategy selector control 602 shows the current strategy utilized by a component configurator to generate or optimize connections among the components of an assembly. The strategies may be stored as preference control signals in a preference control memory structure. The strategy selector control 602 receives an input (or multiple inputs) to select a different strategy for the assembly. In response to an updated strategy, the component configurator may generate new connections. The new connections may be displayed on the display. The strategy may be associated with the assembly control signal for the assembly.

The strategy generation control 604 receives an input to generate a new strategy, which may then be selected with the strategy selector control 602. The new strategy may be stored as a preference control signal in the preference control memory structure. The input may be a string of characters, which may then be associated with the new preference control signal.

The rule attribute controls 606 may be utilized to alter a rule (or preference control signal). The rule attribute controls 606 may receive an input, which then alters the rule for the selected strategy. Multiple control may be displayed to receive an input to alter the rule.

The rule generation control 608 associates the rule (per the rule attribute controls 606 that are selected). The altered strategy is then stored in the preference control memory structure and associated with the current assembly in the assembly control memory structure. A component configurator may then utilize the updated preference control signal to alter the connections among the components of the assembly, which may alter the assembly control signal in the assembly control memory structure.

The 3D configuration display 700 comprises a target component display 702 and a target component control display 704.

The target component display 702 displays components and the connections of the components. The target component display 702 provides a user interface to re-position components previously added. The target component control display 704 provides a user interface to add components to the target component display 702.

Figure 8:
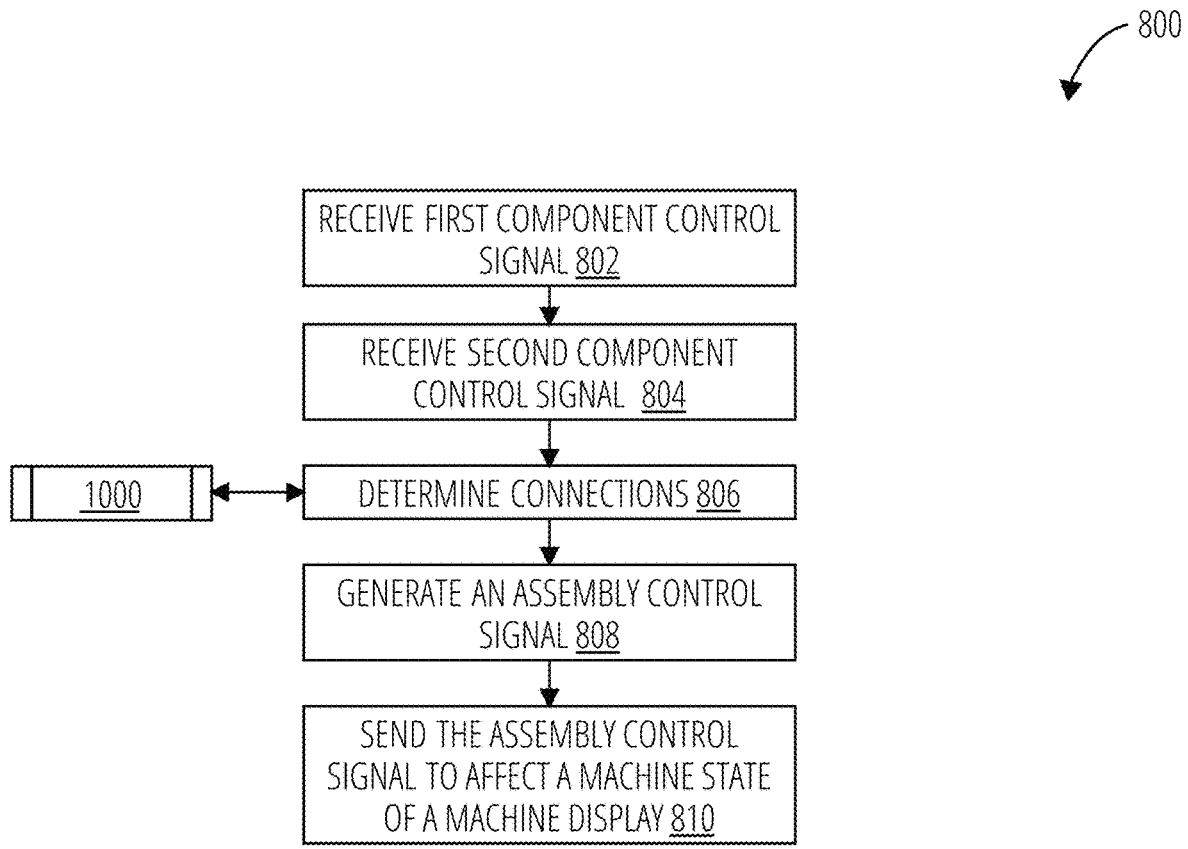
FIG. 8 illustrates an embodiment of an assembly control signal generation method 800.

Referring to FIG. 8, the assembly control signal generation method 800 comprises a receiving a first component control signal (block 802). The first component control signal may comprise a data representation of a first physical object. A second component control signal is received (block 804). The second component control signal may comprise a data representation of a second physical object. The connections between the physical objects represented by the first component control signal and the second component control signal are determined (block 806). The connection subroutine 1000 may be utilized to determine the connections. In addition, a connection modifying control signal may be received to alter the connections determined. An assembly control signal is generated (block 808). The assembly control signal may comprise the connections, the first physical object, and the second physical object as a data representation. The assembly control signal is sent to affect a machine state of one or more machines (block 810). The one or more machines may be a machine display. In addition, the assembly control signal may be transformed to visually differentiate each of the connections by connection media type.

A third component control signal, which comprises a data representation of a third physical object, may also be received. The connections are then re-determined based on including the third physical object with the first physical object and the second physical object.

In some embodiments, an input signal may be received. The input signal is associated with a component control signal, which is stored in a component control signal memory structure and sent to the component configurator as either the first component control signal or the second component control signal. The component control signal may be modified by a preference control signal prior to being sent to the component configurator. In other embodiments, the input signal is associated with a component control signal previously received by the component configurator. The component control signal received by the component configurator is then altered.

An input signal may also be received to alter a preference control signal. For example, the strategy may be altered or a rule of a strategy may be removed, added, or altered. Additionally, the input signal may override a connection generated by the component configurator. In response, the assembly control signal generation method 800 may re-determine the connections in block 806. The assembly control signal may then be altered.

The assembly control signal may also represent the components and the connections as three-dimensional objects and be transformed by the component configurator to represent the components and the connections as two-dimensional objects.

Figure 9:
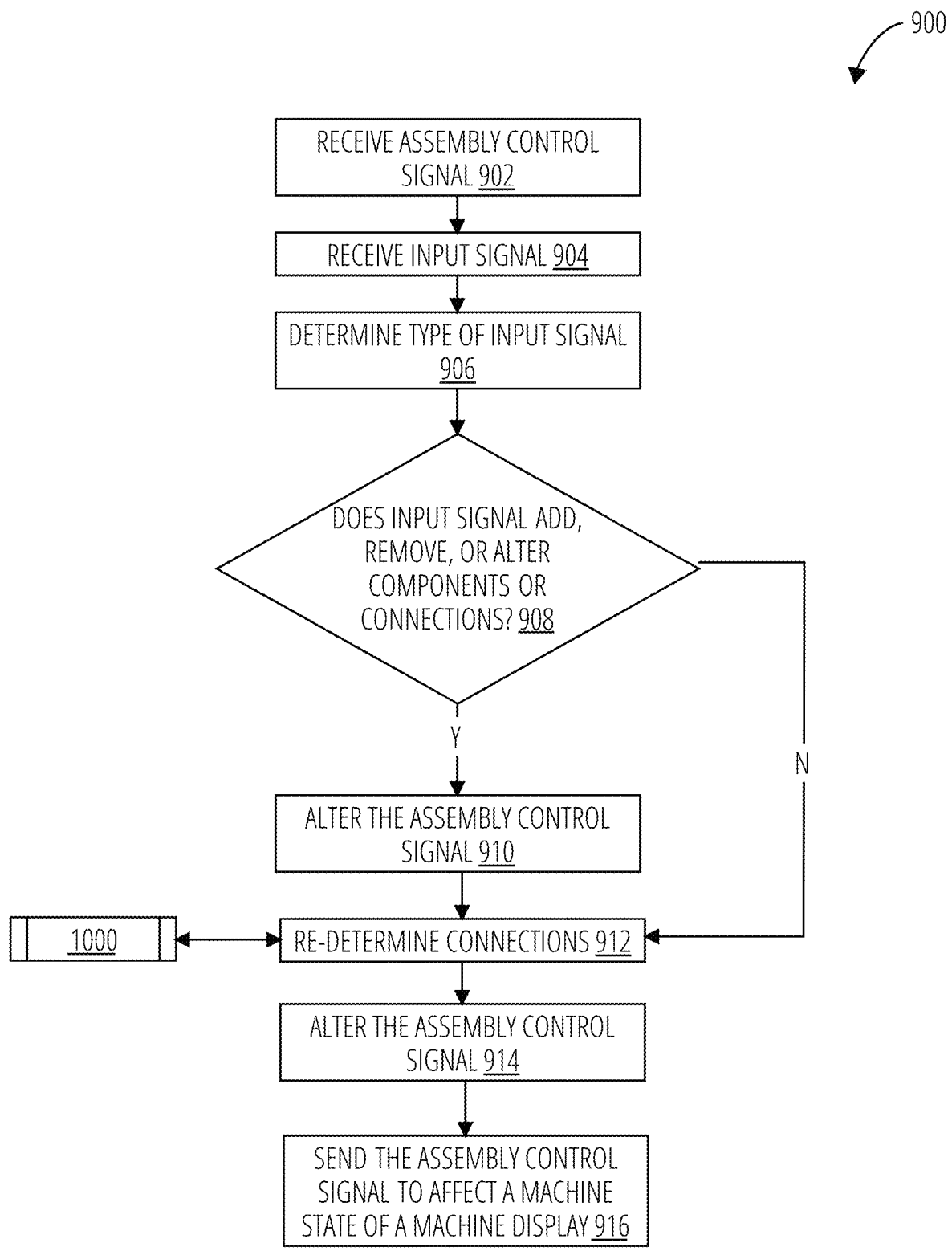
FIG. 9 illustrates an embodiment of an assembly control signal update method 900.

Referring to FIG. 9, the assembly control signal update method 900 receives an assembly control signal (block 902). The assembly control signal may be displayed by a machine display. An input signal is received (block 904). The input signal may be received at the machine display. The type of input signal is determined (block 906). The input signal may add, remove, or alter a component of the assembly control signal, add, remove, or alter a connection of the assembly control signal, alter the component control signal memory structure, the assembly control memory structure, the preference control memory structure, or the connection control memory structure, etc. The assembly control signal update method 900 then determines whether the input signal adds, removes, or alters components or connections of the assembly control signal (decision block 908). If so, the assembly control signal is altered based on the added, removed, or altered components or connections (block 910). If not or once the components or connections have been added, removed, or altered, the connections are re-determined (block 912). The connection subroutine 1000 may be utilized to perform this operation. The assembly control signal is then altered (block 914). The assembly control signal is sent to a machine display to affect its machine state (block 916).

Figure 10:
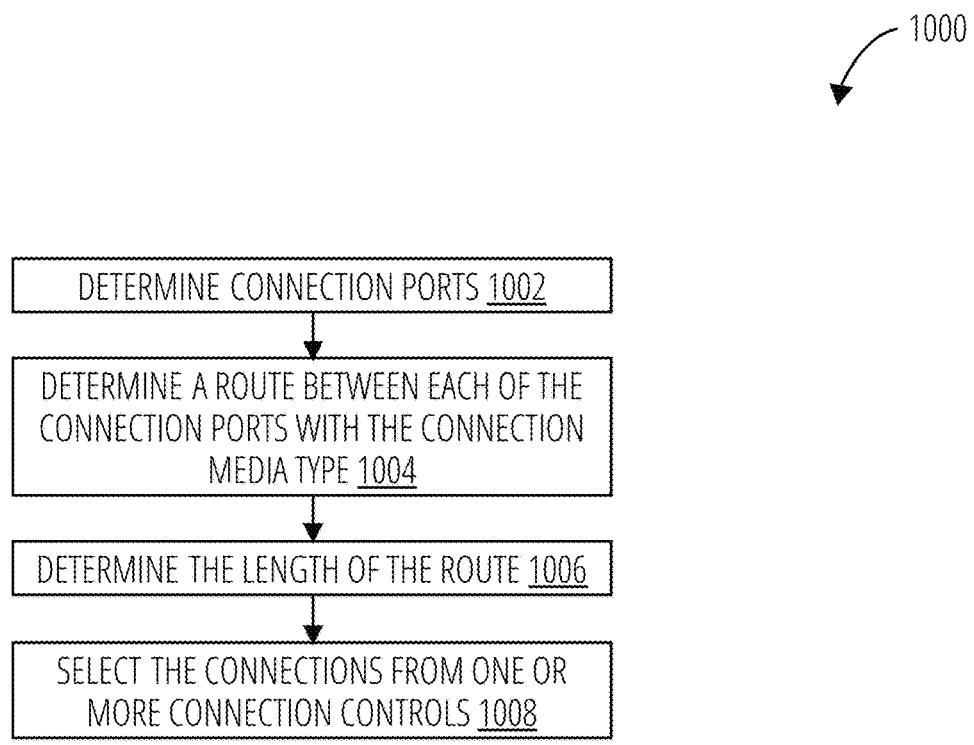
FIG. 10 illustrates an embodiment of a connection subroutine 1000.

Referring to FIG. 10, the connection subroutine 1000 comprises determining connection ports (block 1002). The connection ports are determined for each physical object and by each media type. A route is determined between each of the connection ports with a similar connection media type (block 1004). Routes may be altered by the total number of components being connected utilizing the same connection media type. For example, adding a route to a third component may result in the connection being added to the route determined by the first and second component. Alternatively, in the example, a new route may be formed between the first and third component, eliminating the route between the first and second component and adding a new route between the second component and the route between the first and third component. Additionally, routes may be created between the first and second component, the first and third component, and the second and third component. The routes may be modified based on preference control signals. The length of each route is determined (block 1006). The length of the route may be modified by a slack factor. The connections are selected from one or more connection controls (block 1008). Each of the one or more connection controls may represent a physical connection object.

Figure 11:
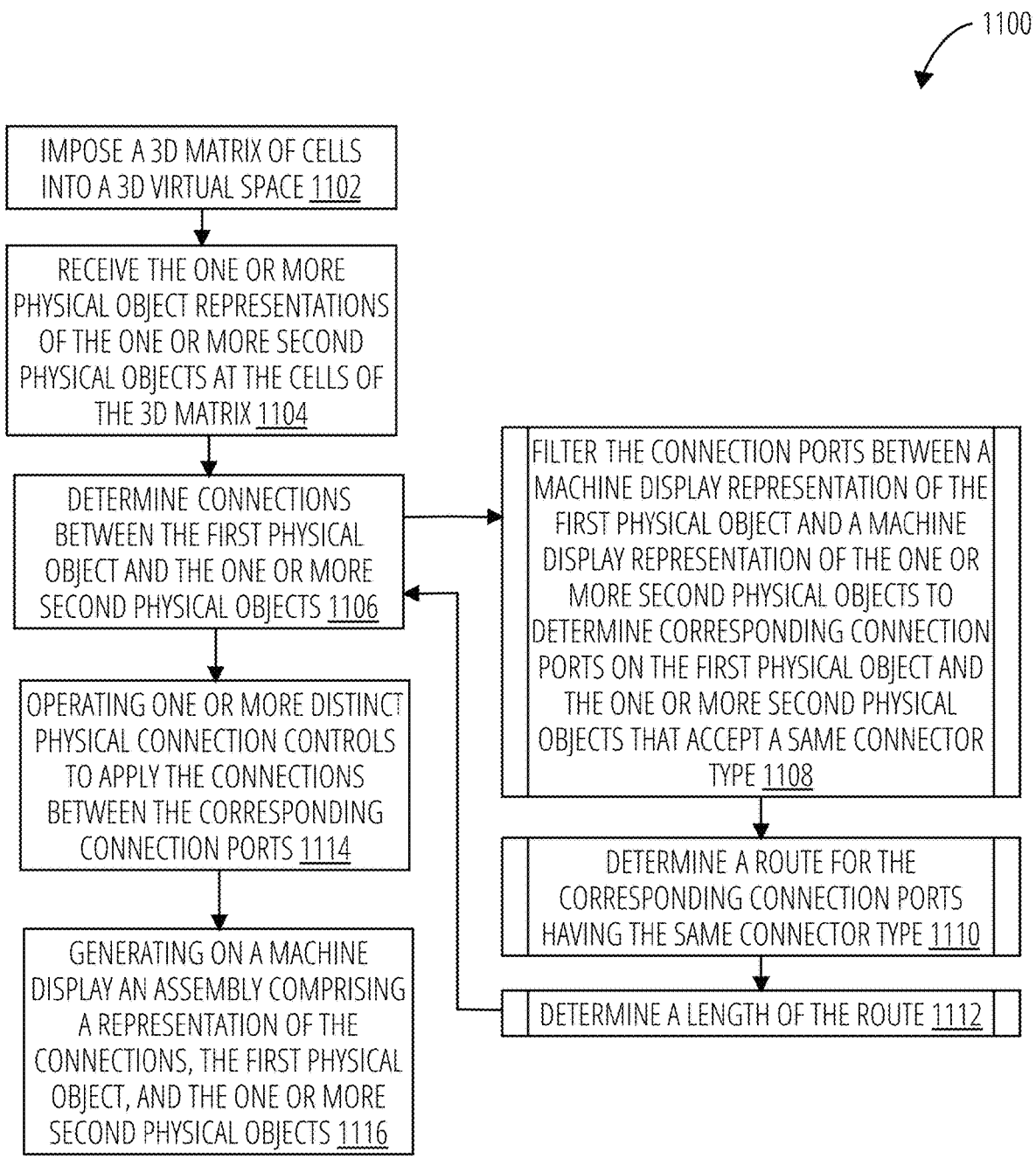
FIG. 11 illustrates an embodiment of an assembly generation method 1100.

Referring to FIG. 11, the assembly generation method 1100 imposes a 3D matrix of cells into a 3D virtual space (block 1102). The 3D matrix may correspond to a first physical object and be able to selectively receive one or more physical object representations corresponding to one or more second physical objects at the cells. The one or more physical object representations of the one or more second physical objects are received at the cells of the 3D matrix (block 1104). Each of the one or more physical object representations comprising a 2D panel with connection ports. The connections between the first physical object and the one or more second physical objects are determined. The connections may be determined by a subroutine. The connection ports between a machine display representation of the first physical object and a machine display representation of the one or more second physical objects are filtered to determine corresponding connection ports on the first physical object and the one or more second physical objects that accept a same connector type (subroutine block 1108). A route is determined for the corresponding connection ports having the same connector type (subroutine block 1110). The route may enable the operability of the first physical object and the one or more second physical objects. A length of the route is then determined (subroutine block 1112). Once the connections are determined, one or more distinct physical connection controls are operated to apply the connections between the corresponding connection ports (block 1114). Each of the one or more connection controls may represent a physical connector. An assembly comprising a representation of the connections, the first physical object, and the one or more second physical objects is generated on a machine display (block 1116).

Figure 12:
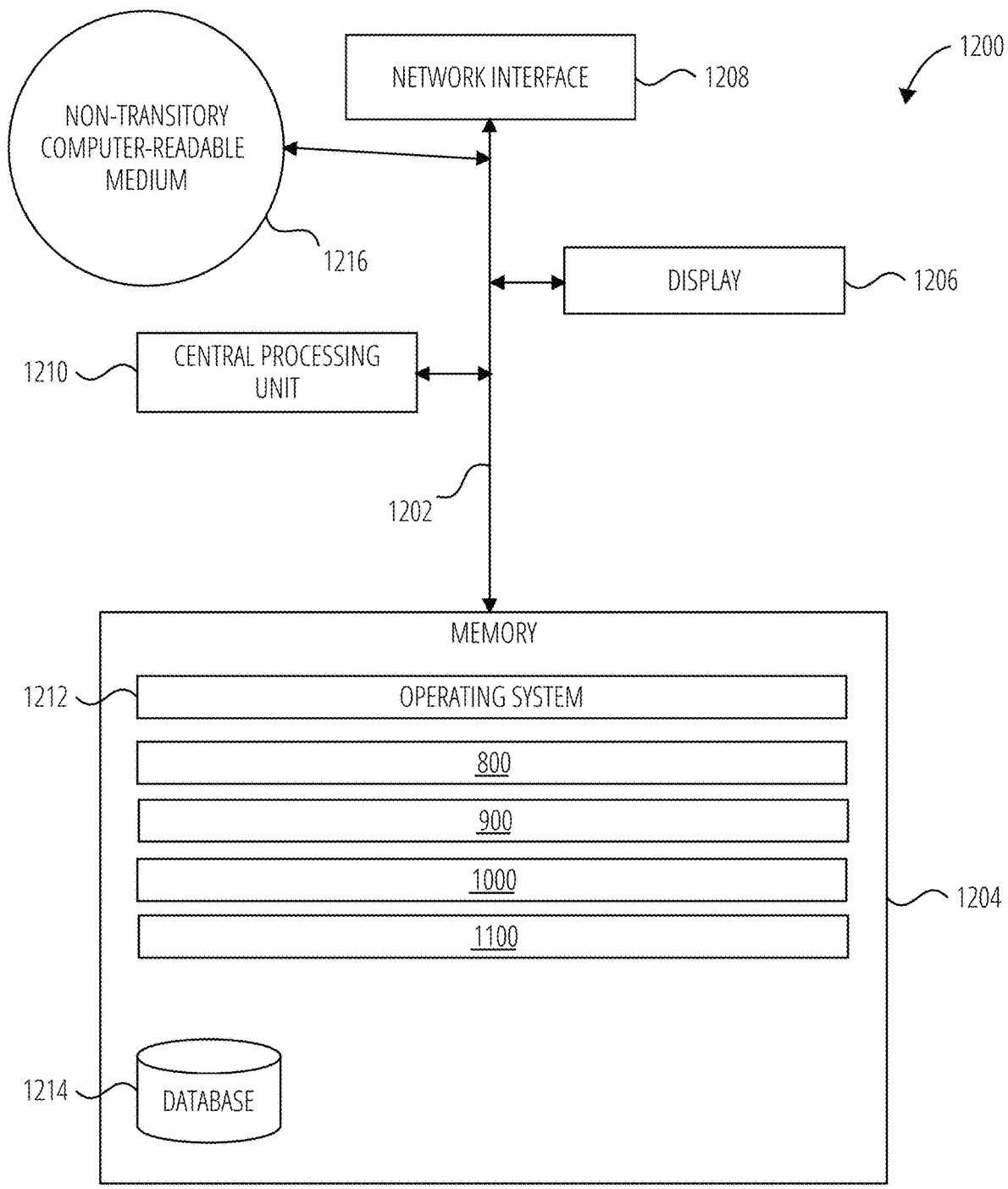
FIG. 12 illustrates a system 1200 in accordance with one embodiment.

FIG. 12 illustrates several components of an exemplary system 1200 in accordance with one embodiment. In various embodiments, system 1200 may include a desktop PC, server, workstation, mobile phone, laptop, tablet, set-top box, appliance, or other computing device that is capable of performing operations such as those described herein. In some embodiments, system 1200 may include many more components than those shown in FIG. 12. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, system 1200 may comprise one or more physical and/or logical devices that collectively provide the functionalities described herein. In some embodiments, system 1200 may comprise one or more replicated and/or distributed physical or logical devices.

In some embodiments, system 1200 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

System 1200 includes a bus 1202 interconnecting several components including a network interface 1208, a display 1206, a central processing unit 1210, and a memory 1204.

Memory 1204 generally comprises a random access memory ("RAM") and permanent non-transitory mass storage device, such as a hard disk drive or solid-state drive. Memory 1204 stores an operating system 1212.

These and other software components may be loaded into memory 1204 of system 1200 using a drive mechanism (not shown) associated with a non-transitory computer-readable medium 1216, such as a DVD/CD-ROM drive, memory card, network download, or the like.

Memory 1204 also includes database 1214. In some embodiments, system 1200 may communicate with database 1214 via network interface 1208, a storage area network ("SAN"), a high-speed serial bus, and/or via the other suitable communication technology.

In some embodiments, database 1214 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" in this context refers to logic implemented as processor-executable instructions in a machine memory (e.g. read/write volatile or nonvolatile memory or media).

"Assembly" in this context refers to a collection of components and connections.

"Associator" in this context refers to a correlator (see the definition for Correlator). Any components described herein that "associate" are thus, inter alia, "associators".

"Classifier" in this context refers to a specific type of correlator/associator logic that associates one or more inputs with a category, class, or other group sharing one or more common characteristics. An example of a classifier that may commonly be implemented in programmable hardware is a packet classifier used in network switches, firewalls, and routers (e.g., packet classifiers utilizing Ternary Content Addressable Memories). An example software or firmware classifier is: if (input1.value<12.5) input1.group=group1; else if (input1.value>=12.5 and input1.value<98.1) input1.group=group2; else input1.group=group3; Other examples of classifiers will be readily apparent to those of skill in the art, without undo experimentation.

"Correlator" in this context refers to a logic element that identifies a configured association between its inputs. One examples of a correlator is a lookup table (LUT) configured in software or firmware. Correlators may be implemented as relational databases. An example LUT correlator is: |low-_alarm_condition |low_threshold_value|0| |safe_condition |safe_lower_bound |safe_upper_bound| |high_alarm_condition|high_threshold_value|0| Generally, a correlator receives two or more inputs and produces an output indicative of a mutual relationship or connection between the inputs. Examples of correlators that do not use LUTs include any of a broad class of statistical correlators that identify dependence between input variables, often the extent to which two input variables have a linear relationship with each other. One commonly used statistical correlator is one that computes Pearson's product-moment coefficient for two input variables (e.g., two digital or analog input signals). Other well-known correlators compute a distance correlation, Spearman's rank correlation, a randomized dependence correlation, and Kendall's rank correlation. Many other examples of correlators will be evident to those of skill in the art, without undo experimentation.

"Data representation" in this context refers to a set of digital signals representing a physical object.

"Selector" in this context refers to a logic element that selects one of two or more inputs to its output as determined by one or more selection controls. Examples of hardware selectors are multiplexers and demultiplexers. An example software or firmware selector is: if (selection control==true) output=input1; else output=input2; Many other examples of selectors will be evident to those of skill in the art, without undo experimentation.

"Signal" in this context refers to one or more energy impulses that convey control commands, data, or attributes between machine elements or between people, or a combination of machines and people. Any physical entity exhibiting variation in time or variation in space is potentially a signal. Examples of signals include electrical impulses such as analog or binary electrical phenomenon, audio, video, speech, image, communication, geophysical, sonar, radar, and musical signals.

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

COMPUTER CODE LISTING

Listing (i)

```
If Input signal carries or refers to a component definition
        Extract component's previous assembly state (position, parent component) and new assembly state to variables
        If the component has no previous attachment state but has a new attachment state
                Component was newly added from Component Control Memory Structure - Recalculate automatic connections for assembly
        If the component has a previous attachment state but no new attachment state
                Component was removed - Recalculate automatic connections for assembly and remove manual connections
        If the component has both a previous attachment state and a new attachment state
                Component was moved in the assembly - Recalculate automatic connections and recalculate paths for manual connections
```

Listing (ii)

```
For each component in the Assembly Memory Structure
        For each connection port defined on the input item
                Extract port behavior attribute
                If port behavior determines that the port should seek a connection
                        Add to list of actionable ports in the Assembly Control Memory Structure
                Else If port behavior determines that the port can receive connections
                        Add to list of automatically assignable ports in the Assembly Control Memory Structure
                Else
                        Add to list of manually assignable ports in the Assembly Control Memory Structure
        For each actionable "source" port in the Assembly Control Memory Structure
                Extract port type attribute
```

Listing (ii)
-continued

```
                Filter list of automatically assignable ports to those with a matching port type and that are not already marked connected
                        For each potential "target" port in the filtered list
                                Compare source and target port and component properties (position, class, etc.) according to rule setup in Preference Control Memory Structure
                                        If comparison approves the port selection
                                                Mark source and target ports connected
                                                Determine connection path according to preference settings (which will indicate whether or not to route through intermediary ports or components such as cable management)
                                                        Add each segment of the path as a start point coordinate (x,y,z) and end point coordinate pair to a list describing the overall path of the connection
                                                        Add connection and route path segment collection to Assembly Control Memory Structure
                                        If no valid target port found, leave port unconnected and optionally display a message to the user
```

Listing (iii)

```
For a given connection in the Assembly Control Memory Structure
        Initialize variable routeLength to 0
        For each route path segment
                Calculate distance between start point coordinate and end point coordinate
                Add that segment distance to routeLength
        Return routeLength
For a given connection in the Assembly Control Memory Structure
        Get route length (from #3 above)
        Extract connection's port type
        Look up port type definition in Connection Control Memory Structure
        Extract slack adjustment factor
        slack amount to include in connection media = route length * slack adjustment factor
        Total length of connection media necessary = slack distance + route length
```

Listing (iv)

```
While preparing each connection route's graphical overlay for delivery to a 2D Display Driver...
        Determine what viewing angle is currently being projected (front, back, left, right, top, bottom) from setting in Preference Control Memory Structure
        Transform start and end point coordinates of each path segment from a 3D point (x,y,z) in "assembly space" to a 2D point (x,y) in "projected space", so that viewing angle rotation is taken into account and the axis perpendicular to the projection plane is left out
        Send connection's graphical representation to display driver using the transformed path data
```

What is claimed is:

1. A non-transitory machine-readable medium comprising instructions that, when executed by a computer processor, result in:
    imposing a 3D matrix of cells into a 3D virtual space in a machine memory, the 3D matrix corresponding to a first physical object and able to selectively receive one or more physical object representations corresponding to one or more second physical objects at the cells;

receiving the one or more physical object representations of the one or more second physical objects at the cells of the 3D matrix, each of the one or more physical object representations comprising a 2D panel with connection ports;

determining connections between the first physical object and the one or more second physical objects by:

filtering the connection ports between a machine display representation of the first physical object and a machine display representation of the one or more second physical objects to determine corresponding connection ports on the first physical object and the one or more second physical objects that accept a same connector type;

determining a route for the corresponding connection ports having the same connector type, the route enabling operability of the first physical object and the one or more second physical objects; and determining a length of the route;

operating one or more distinct physical connection controls on a machine display to apply the connections between the corresponding connection ports, each of the one or more connection controls representing a physical connector; and generating on the machine display an assembly comprising a representation of the connections, the first physical object, and the one or more second physical objects.

2. The non-transitory machine-readable medium of claim 1, further comprising instructions that, when executed by the computer processor, result in modifying the length of the route by a slack factor.

3. The non-transitory machine-readable medium of claim 1, further comprising instructions that, when executed by the computer processor, result in:

receiving an input signal at the computer processor;

associating the input signal with a component control signal, the component control signal stored in a component control signal memory structure in the machine memory; and sending the component control signal to a component configurator as a first component control signal or a second component control signal.

4. The non-transitory machine-readable medium of claim 3, wherein the component control signal is modified by a preference setting prior to being sent to the component configurator.

5. The non-transitory machine-readable medium of claim 1, further comprising instructions that, when executed by the computer processor, result in:

receiving an input signal at the computer processor;

associating the input signal with a component control signal, the component control signal previously being received by a component configurator as either a first component control signal or a second component control signal; and altering the component control signal received by the component configurator.

6. The non-transitory machine-readable medium of claim 1, further comprising instructions that, when executed by the computer processor, result in:

receiving a third component control signal, the third component control signal comprising a data representation of a third physical object; and determining the connections for the first physical object, the one or more second physical objects, and the third physical object, wherein the assembly comprises a data representation of the connections, the first physical object, the one or more second physical objects, and the third physical object.

7. The non-transitory machine-readable medium of claim 1, further comprising instructions that, when executed by the computer processor, result in:

receiving a connection modifying control signal; and in response, altering the connections.

8. The non-transitory machine-readable medium of claim 1, wherein the assembly represents components and the connections as three-dimensional objects, further comprising transforming the assembly to represent the components and the connections as two-dimensional objects on the machine display.

9. The non-transitory machine-readable medium of claim 1, further comprising transforming the assembly to visually differentiate each connection media type on the machine display.

10. A system comprising:

a component configurator to:

receive a first component control signal comprising a data representation of a first physical object;

receive a second component control signal comprising a data representation of a second physical object;

determine connections for the data representation of the first physical object and the data representation of the second physical object by:

determining connection ports between the data representation of the first physical object and the data representation of the second physical object that utilize a connection media type that is the same;

determining a route between each of the connection ports with the connection media type that is the same based on the first component control signal and the second component control signal;

determining a length of the route; and selecting the connections from one or more connection controls, each of the one or more connection controls representing a physical connection object;

generate an assembly control signal, the assembly control signal comprising a data representation of the connections, the first physical object, and the second physical object; and send the assembly control signal to affect a machine state of a machine display; and the machine display to display the assembly control signal.

11. The system of claim 10, wherein the component configurator may further operate to modify the length of the route by a slack factor.

12. The system of claim 10, further comprising a selector, wherein: the machine display to:

receive an input signal to operate the component configurator; and send the input signal to the selector; and the selector to:

associate the input signal with a component control signal, the component control signal stored in a component control signal memory structure; and send the component control signal to the component configurator as either the first component control signal or the second component control signal.

13. The system of claim 12, wherein the selector modifies the component control signal with a preference setting prior to sending the component control signal to the component configurator.

14. The system of claim 10, further comprising a selector, wherein: the machine display to:

receive an input signal; and
send the input signal to the selector; and
the selector to:
    associate the input signal with a component control signal, the component control signal previously being received by the component configurator as either the first component control signal or the second component control signal; and
    alter the component control signal received by the component configurator.

15. The system of claim 10, the component configurator to further:
    receive a third component control signal, the third component control signal comprising a data representation of a third physical object; and
    determine the connections for the first physical object, the second physical object, and the third physical object, wherein the assembly control signal comprises a data representation of the connections, the first physical object, the second physical object, and the third physical object.

16. The system of claim 10, the component configurator to further:
    receive a connection modifying control signal; and
    in response, alter the connections.

17. The system of claim 10, further comprising a display driver, wherein the assembly control signal represents components and the connections as three-dimensional objects, the display driver transforming the assembly control signal to represent the components and the connections as two-dimensional objects.

18. The system of claim 10, further comprising a display driver to transform the assembly control signal to visually differentiate each connection media type.

\* \* \* \* \*